US007554993B2

(12) United States Patent  (10) Patent No.: US 7,554,993 B2
Modi et al.  (45) Date of Patent: Jun. 30, 2009

(54) METHOD AND APPARATUS FOR PERFORMING CONNECTION MANAGEMENT WITH MULTIPLE STACKS

(75) Inventors: Prashant Modi, Fremont, CA (US); Ambitabha Biswas, San Francisco, CA (US); Kathryn Hampton, Los Gatos, CA (US); Yiu Yip, Cupertino, CA (US); Dwight L. Barron, Houston, TX (US); Jeffrey R. Hilland, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 949 days.

(21) Appl. No.: 10/401,237

(22) Filed: Mar. 27, 2003

(65) Prior Publication Data
US 2004/0190533 A1 Sep. 30, 2004

(51) Int. Cl.
*H04L 12/56* (2006.01)
*H04J 3/24* (2006.01)
*H04J 3/22* (2006.01)
(52) U.S. Cl. .................. 370/401; 370/466; 370/469
(58) Field of Classification Search ................ 370/389, 370/392, 400, 401, 465, 466, 469
See application file for complete search history.

(56) References Cited

U.S. PATENT DOCUMENTS

| 5,325,532 A | 6/1994 | Crosswy et al. |
| 5,675,807 A | 10/1997 | Iswandhi et al. |
| 5,737,604 A | 4/1998 | Miller et al. |
| 5,751,932 A | 5/1998 | Horst et al. |
| 5,809,285 A | 9/1998 | Hilland |
| 5,815,707 A | 9/1998 | Krause et al. |
| 5,822,571 A | 10/1998 | Goodrum et al. |
| 5,870,568 A | 2/1999 | Culley et al. |
| 5,872,941 A | 2/1999 | Goodrum et al. |
| 5,914,953 A | 6/1999 | Krause et al. |
| 5,948,111 A | 9/1999 | Taylor et al. |

(Continued)

FOREIGN PATENT DOCUMENTS

EP 0757318 A2 2/1997

OTHER PUBLICATIONS

Microsoft, Winsock Direct and Protocol Offload on SANs, Windows Platform Design Notes pp. 1-7 http://www.microsoft.com/whdc/device/network/san/WSD-SAN.mspx.*

*Primary Examiner*—Wing F Chan
*Assistant Examiner*—Marcus R Smith

(57) ABSTRACT

The disclosed embodiments relate to a communication device for use in a node of a system having a plurality of nodes. Each of the plurality of nodes may include network interface controllers ("NICs") and each of the NICs may have a public identifier and a private identifier associated therewith. A first protocol stack may operate according to a first protocol that is associated with the public identifier and a second protocol stack may operate according to a second protocol that is associated with the private identifier. A storage device may associate the public identifier of one or more of the NICs with the first protocol stack and the private identifier of one or more of the NICs with the second protocol stack. Received messages that incorporate the public identifier may be directed to the first protocol stack and messages that incorporate the private identifier may be directed to the second protocol stack.

34 Claims, 5 Drawing Sheets

U.S. PATENT DOCUMENTS

| | | |
|---|---|---|
| 5,964,835 A | 10/1999 | Fowler et al. |
| 5,983,269 A | 11/1999 | Mattson et al. |
| 6,018,620 A | 1/2000 | Culley et al. |
| 6,047,323 A | 4/2000 | Krause |
| 6,070,198 A | 5/2000 | Krause et al. |
| 6,070,253 A | 5/2000 | Tavallaei et al. |
| 6,157,967 A | 12/2000 | Horst et al. |
| 6,163,834 A | 12/2000 | Garcia et al. |
| 6,233,702 B1 | 5/2001 | Horst et al. |
| 6,484,208 B1 | 11/2002 | Hilland |
| 6,493,343 B1 | 12/2002 | Garcia et al. |
| 6,496,940 B1 | 12/2002 | Horst et al. |
| 6,502,203 B2 | 12/2002 | Barron et al. |
| 6,618,386 B1 * | 9/2003 | Liu et al. ............... 370/401 |
| 6,757,734 B1 * | 6/2004 | Resenius et al. ........ 709/230 |
| 6,895,590 B2 * | 5/2005 | Yadav ..................... 719/328 |
| 7,120,701 B2 * | 10/2006 | Warrier et al. ........... 709/245 |
| 2002/0101848 A1 * | 8/2002 | Lee et al. ................ 370/349 |
| 2003/0081601 A1 * | 5/2003 | Morris et al. ............ 370/389 |
| 2004/0019689 A1 * | 1/2004 | Fan ......................... 709/230 |
| 2004/0093430 A1 * | 5/2004 | Thomas .................. 709/245 |

* cited by examiner

METHOD AND APPARATUS FOR PERFORMING CONNECTION MANAGEMENT WITH MULTIPLE STACKS

BACKGROUND OF THE RELATED ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In the field of computer systems, it may be desirable for information to be transferred from a system memory associated with one computer system to a system memory associated with another computer system. Communication between computer systems may involve exchanging and processing messages through a proprietary protocol stack at each of the computer systems. However, these proprietary networks may not be compatible with other networks or systems that employ different communication protocols.

If multiple protocols are used to facilitate communication within networks, packets may be mishandled. For instance, a packet that was formatted under a first protocol may be incorrectly interpreted as being formatted under a second protocol. In such a case, the information contained within the mishandled packets may be misdirected or lost.

BRIEF DESCRIPTION OF THE DRAWINGS

Advantages of the invention may become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The Remote Direct Memory Access ("RDMA") Consortium, which includes the assignee of the present invention, is developing specifications to improve the ability of computer systems to remotely access the memory of other computer systems. One such specification under development is the RDMA Consortium Protocols Verb specification, which is hereby incorporated by reference. The verbs defined by this specification may correspond to operations or actions that may form an interface for data transfers between memories in computer systems, including the formation and management of queue pairs, memory windows, protection domains and the like.

RDMA may refer to the ability of one computer to directly place information in the memory space of another computer, while minimizing demands on the central processing unit ("CPU") and memory bus. In an RDMA system, an RDMA layer may interoperate over any physical layer in a Local Area Network ("LAN"), Server Area Network ("SAN"), Metropolitan Area Network ("MAN"), or Wide Area Network ("WAN").

Figure 1:
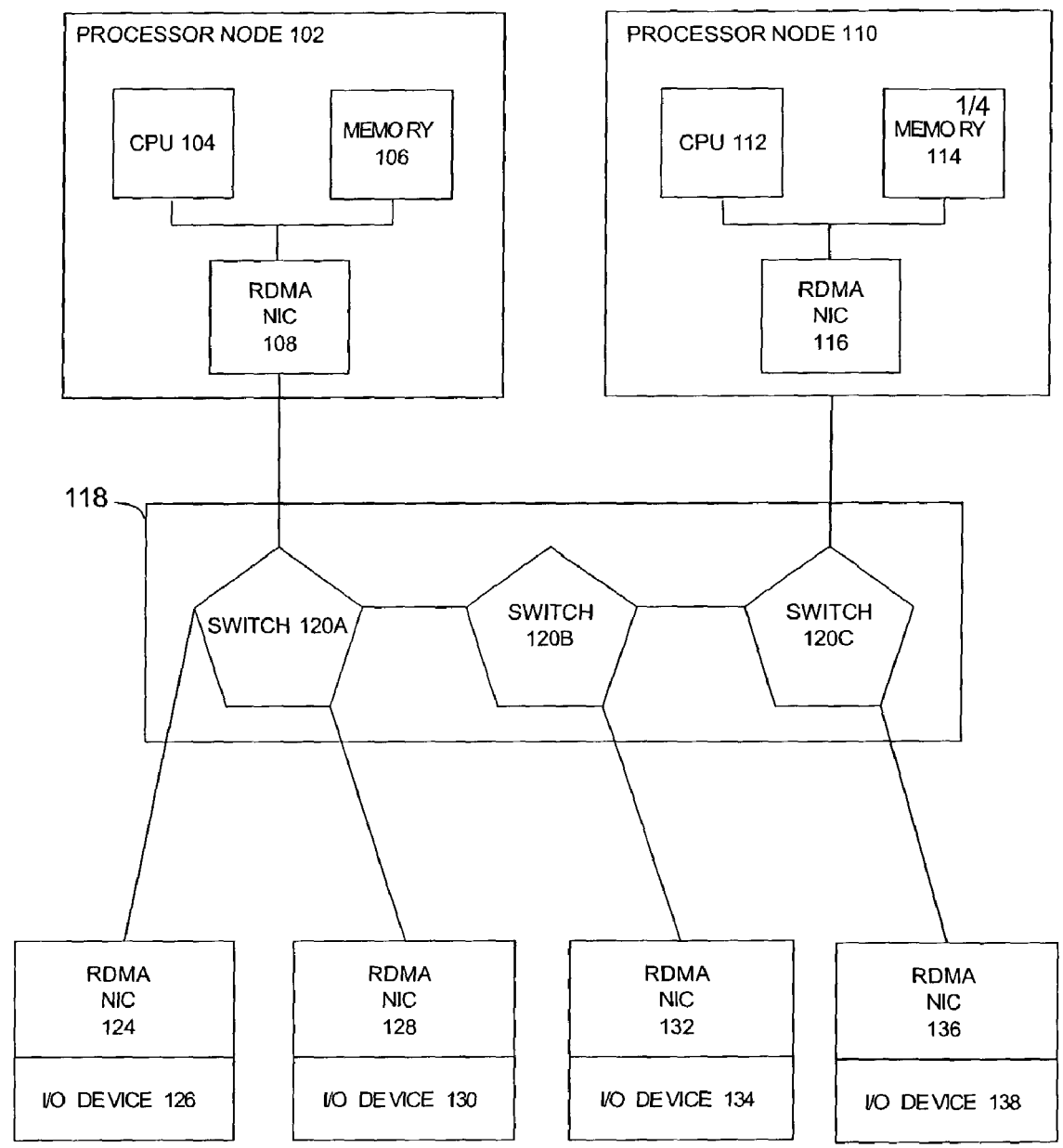
FIG. 1 is a block diagram illustrating a computer network in accordance with embodiments of the present invention.

Referring now to FIG. 1, a block diagram illustrating a computer network in accordance with embodiments of the present invention is illustrated. The computer network is indicated by the reference numeral 100 and may comprise a first processor node 102 and a second processor node 110, which may be connected to a plurality of I/O devices 126, 130, 134, and 138 via a switch network 118. Each of the I/O devices 126, 130, 134 and 138 may utilize a Remote Direct Memory Access-enabled Network Interface Card ("RNIC") to communicate with the other systems. In FIG. 1, the RNICs associated with the I/O devices 126, 130, 134 and 138 are identified by the reference numerals 124, 128, 132 and 136, respectively. The I/O devices 126, 130, 134, and 138 may access the memory space of other RDMA-enabled devices via their respective RNICs and the switch network 118.

The topology of the network 100 is for purposes of illustration only. Those of ordinary skill in the art will appreciate that the topology of the network 100 may take on a variety of forms based on a wide range of design considerations. Additionally, NICs that operate according to other protocols, such as InfiniBand, may be employed in networks that employ such protocols for data transfer.

The first processor node 102 may include a CPU 104, a memory 106, and an RNIC 108. Although only one CPU 104 is illustrated in the processor node 102, those of ordinary skill in the art will appreciate that multiple CPUs may be included therein. The CPU 104 may be connected to the memory 106 and the RNIC 108 over an internal bus or connection. The memory 106 may be utilized to store information for use by the CPU 104, the RNIC 108, or other systems or devices. The memory 106 may include various types of memory such as Static Random Access Memory ("SRAM") or Dynamic Random Access Memory ("DRAM").

The second processor node 110 may include a CPU 112, a memory 114, and an RNIC 116. Although only one CPU 112 is illustrated in the processor node 110, those of ordinary skill in the art will appreciate that multiple CPUs may be included therein. The CPU 112 may be connected to the memory 114 and the RNIC 116 over an internal bus or connection. The memory 114 may be utilized to store information for use by the CPU 112, the RNIC 116 or other systems or devices. The memory 114 may utilize various types of memory such as SRAM or DRAM.

The switch network 118 may include any combination of hubs, switches, routers and the like. In FIG. 1, the switch network 118 comprises switches 120A-120C. The switch 120A connects to the switch 120B, the RNIC 108 of the first processor node 102, the RNIC 124 of the I/O device 126 and the RNIC 128 of the I/O device 130. In addition to its connection to the switch 120A, the switch 120B connects to the switch 120C and the RNIC 132 of the I/O device 134. In addition to its connection to the switch 120B, the switch 120C connects to the RNIC 116 of the second processor node 110 and the RNIC 136 of the I/O device 138.

Each of the processor nodes 102 and 110 and the I/O devices 126, 130, 134, and 138 may be given equal priority and the same access to the memory 106 or 114. In addition, the memories may be accessible by remote devices such as the I/O devices 126, 130, 134 and 138 via the switch network 118. The first processor node 102, the second processor node 110 and the I/O devices 126, 130, 134 and 138 may exchange information using one or more communication protocols. The exchange of information using multiple protocols is explained with reference to FIG. 2.

Figure 2:
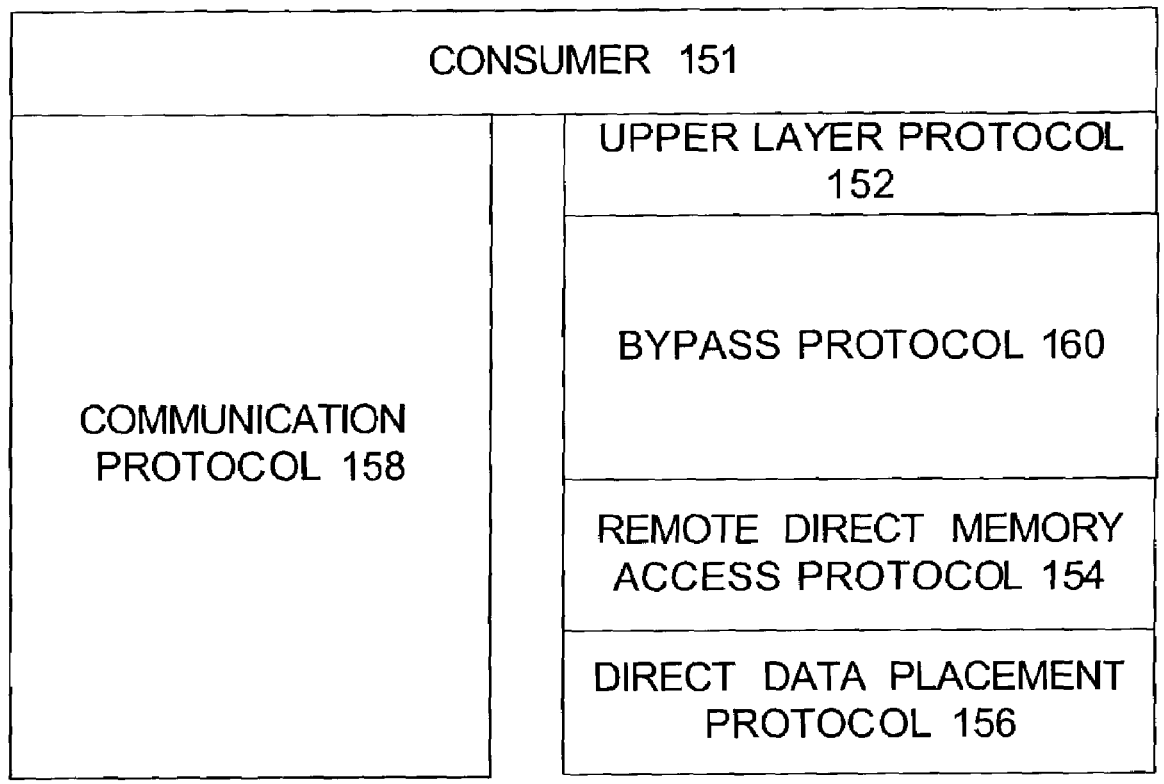
FIG. 2 is a block diagram illustrating the adaptation of a consumer with multiple protocols in accordance with embodiments of the present invention.

FIG. 2 is a block diagram illustrating the adaptation of a consumer with multiple protocols in accordance with embodiments of the present invention. The block diagram of a consumer with multiple protocols is indicated by the reference numeral 150. The RNICs 108, 116, 124, 128, 132 and 136 (FIG. 1) may be adapted to exchange information using multiple protocols.

A consumer 151, which may comprise a process or application, may interact with two different protocol layer stacks. The first protocol layer stack may include an upper layer protocol ("ULP") 152, which may interact with a kernel bypass protocol 160. Examples of protocols that may be used for the kernel bypass protocol 160 include the WinSock Direct ("WSD") protocol, the Sockets Direct Protocol ("SDP") or the like. The kernel bypass protocol 160 may interact with an RDMA protocol 154. The RDMA protocol 154 may interact with a direct data placement protocol ("DDP") 156. The kernel bypass protocol 160, the upper layer protocol 152, the RDMA protocol 154 and the DDP 156 may be employed to bypass the kernel of the operating system ("OS") of the device that hosts the RNIC.

The bypass protocol 160 may allow unmodified socket applications to enhance performance of the system by utilizing features of the RDMA protocols, such as protocol offload, OS bypass, true zero copy of data. The kernel bypass protocol 160 may employ kernel bypass protocol stacks to optimize network performance. The use of the kernel bypass stacks may allow increased bandwidth efficiency, lowered messaging latency and conserving processor time for use by applications. Thus, the kernel bypass stacks may improve the data transfers for systems within the network.

The DDP protocol 156 may translate messages from the RDMA protocol 154 for transmission across a network, such as switch network 118 (FIG. 1). Also, the DDP protocol 156 may receive messages from other nodes and translate those messages for transmission using the RDMA protocol 154. The term iWARP may be used to refer to the suite of protocols comprising the RDMA protocol 154, the DDP protocol 156 and a marker with protocol data unit alignment ("MPA") protocol (not shown) which may be layered with the bypass protocol 160.

For other messages, the consumer 151 may interact with a second protocol stack, such as a communication protocol 158, which may include the transmission control protocol/internet protocol ("TCP/IP") or the like. In addition to the IP protocol, routing information may be provided by a routing protocol such as AppleTalk, DEC Net or the like. The communication protocol 158 may comprise other protocols, such as the User Datagram Protocol ("UDP") or the like. Another communication protocol may be used to provide message framing within the TCP byte stream by using a fixed interval marker mechanism, such as the MPA protocol. The MPA protocol may include a length, may add a backward marker at a fixed interval to segments of upper level data, and/or may add cyclical redundancy check ("CRC") information. The operation of the communication protocol 158 and the kernel bypass protocol 160 is further explained with respect to FIG. 3.

Figure 3:
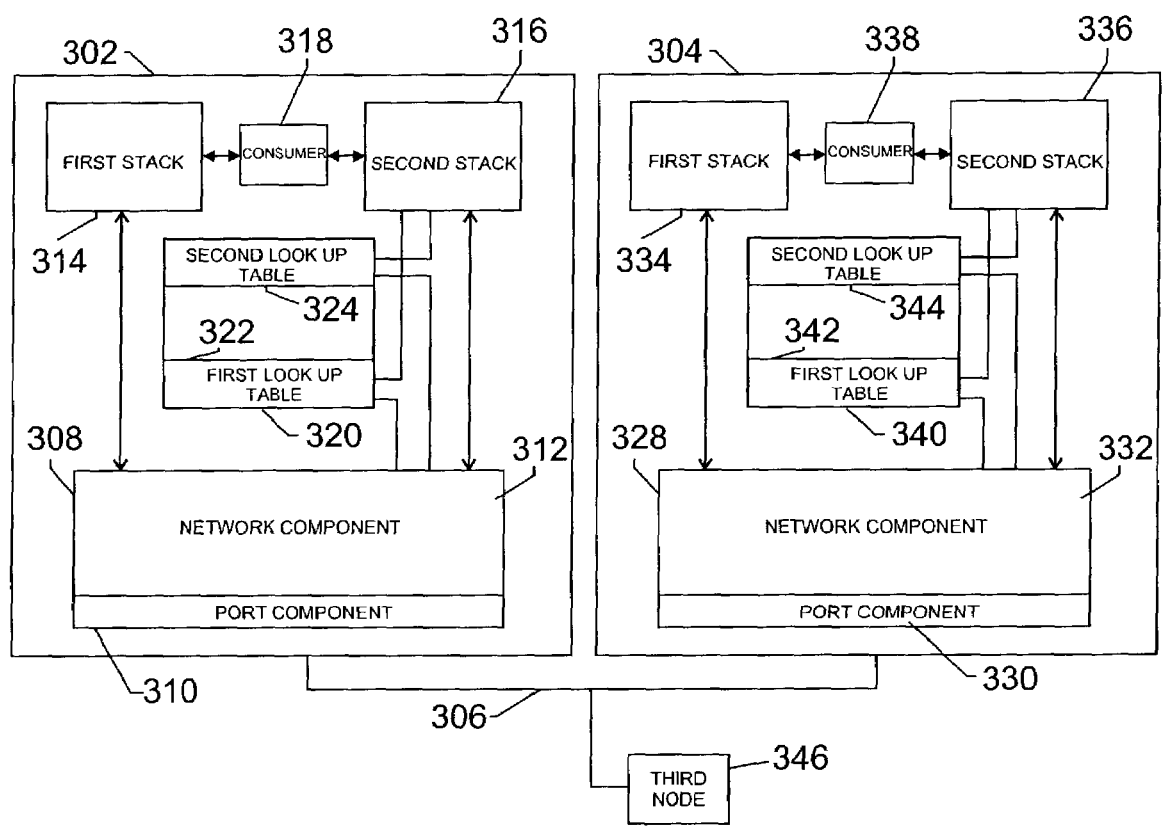
FIG. 3 is a block diagram of a multiple protocol stack configuration in accordance with embodiments of the present invention.

FIG. 3 is a block diagram of a multiple protocol stack configuration in accordance with embodiments of the present invention. The block diagram is generally indicated by the reference numeral 300. A first node 302 and a second node 304, which may correspond to any of the processor nodes 102 or 110, or the I/O devices 126, 130, 134 or 138 shown in FIG. 1, may be connected via a network 306. The network 306 may correspond to the switch network 118 of FIG. 1. The nodes 302 and 304 may exchange packets or messages across the network 306 using various protocols, such as the communication protocol 158 or the bypass protocol 160 (FIG. 2). Each of the nodes 302 and 304 may include various components to manage the exchange of messages through various protocols, such as a multiple stack configuration with each of the stacks corresponding to a unique media access control ("MAC") address.

The first node 302 comprises an RNIC 308 and the second node 304 comprises an RNIC 328. The RNIC 308 comprises a physical port component 310 and the RNIC 328 comprises a physical port component 330. The physical port components 328 and 330 may receive and transmit data packets across the network 306. The RNICs 308 and 328 may communicate using the iWARP suite of protocols. These protocols may employ packets that contain source addresses as well as destination addresses, which may include multiple MAC addresses for each of the respective nodes 302 or 304. The physical port component 310 or 330 may be logically divided to support one or more of the upper level components, such as one of the multiple stacks or other components in the RNIC 308 or 328.

The network components 312 and 332 may also manage other functions, such as an address resolution protocol ("ARP"), a dynamic host configuration protocol ("DHCP"), and an Internet group management protocol ("IGMP"). ARP may be a used to dynamically resolve a high level IP address to a low-level hardware address across a physical network. DHCP may provide a framework for passing configuration information to hosts on a network, which may add the capability of automatic allocation of reusable network addresses and additional configuration options. IGMP may allow a node 302 or 304 to report its multicast group membership to adjacent routers or network equipment to allow the node 302 or 304 to send information to other nodes 302 or 304 that have identified themselves as interested in receiving the information. Through the RNICs 308 and 328, a first stack 314 (for the RNIC 308) may be connected to a first stack 334 (for the RNIC 328), while a second stack 316 (for the RNIC 308) may be connected to a second stack 336 (for the RNIC 328).

The first stacks 314 and 334 may be protocol stacks used to manage communication according to the communication protocol 158 (FIG. 2). The first stacks 314 and 334 may provide standard (non-proprietary) methods for protocol addressing, sending and receiving datagrams, writing and reading on streams, and/or detecting disconnects for interfacing with an application-programming interface ("API"). Also, the first stacks 314 and 334 may provide connection-oriented service or port for-a specific application to use in communicating with other nodes.

The second stacks 316 and 336 may be protocol stacks used to manage communication according to the kernel bypass protocol 160 (FIG. 2). The second stacks 316 and 336 may comprise a WSD stack or SDP stack that may use RDMA features to bypass the kernel and to reduce the load on a processor within the node 302 or 304. A graphical user interface ("GUI") may be implemented to interact with an API and WSD stack. The GUI may translate information to associate an IP address to the stack. The second stack 316 or 336 may provide proprietary methods for protocol addressing, sending and receiving datagrams or messages, writing and reading on streams, and/or detecting disconnects for interfacing with an API. Also, the second stacks 316 and 336 may provide connection-oriented service or port for a specific application to use in communicating with other nodes 302 or 304.

The first node may comprise a memory 320 and the second node 304 may comprise a memory 340. The memories 320 and 340 may include various types of memory, including static read only memory ("SRAM") or dynamic read only memory ("DRAM"). For purposes of illustration, the memory 320 may correspond to the memory 106 (FIG. 1) and the memory 340 may correspond to the memory 114 (FIG. 1). The memories 320 and 340 may store, among other things, IP or MAC addresses associated with the communication protocol 158 and the kernel bypass protocol 160 (FIG. 2). Each of the RNICs may have a separate MAC and IP address assigned thereto for each of the communication protocol 158 (FIG. 2) and the kernel bypass protocol 160 (FIG. 2). The IP address associated with the communication protocol 158 (FIG. 2) may be public and the IP address associated with the kernel bypass protocol 160 (FIG. 2) may be private. When a data packet arrives at the RNIC 308 or 328, the IP address in the packet directs the packet to be processed by the first stacks 314 or 334 if the IP address of the packet corresponds to the communication protocol 158 (FIG. 2). When a data packet arrives at the RNIC 308 or 328, the IP address in the packet directs the packet to be processed by the second stacks 316 or 336 if the IP address of the packet corresponds to the kernel bypass protocol 160 (FIG. 2).

The memory 320 of the node 302 may store a first lookup table 322 and a second lookup table 324. The first lookup table 322 and the second lookup table 324 may be accessible by the second protocol stack 316, which is associated with the kernel bypass protocol 160 (FIG. 2). The memory 340 of the node 304 may store a first lookup table 342 and a second lookup table 344. The first lookup table 342 and the second lookup table 344 may be accessible by the second protocol stack 336, which is associated with the kernel bypass protocol 160 (FIG. 2).

The first lookup tables 322 and 342 may include a local address list that may comprise public IP address and a corresponding private IP address associated with local devices or nodes. The second lookup tables 324 and 344 may include a remote address list that may comprise public IP addresses and corresponding private IP addresses for remote devices. The second lookup tables 324 and 344 may grow as IP addresses for newly discovered remote devices are added. In some embodiments of the invention, the first and second lookup tables 322, 324, 342, and 344 for each node may be unified. The IP addresses stored in the first lookup tables 322 and 342 and the second lookup tables 324 and 344 may be included in packets that are being sent from their respective nodes using the kernel bypass protocol 160 (FIG. 2), which is associated with the second protocol stacks 316 and 336. In other words, the first lookup tables 322 and 342 and the second lookup tables 324 and 344 may associate the IP addresses of the associated RNIC to the MAC address of the RNIC for purposes of communication using the kernel bypass protocol 160 (FIG. 2).

The MAC address corresponding to the stacks 314, 316, 334 and 336 may be manually or automatically entered. The MAC address for each stack may be created based on information in the associated memory (320 or 340), a setting associated with the physical port component (310 or 330), or from information elsewhere within the respective node (302 or 304). Each MAC address may have an associated routing address, such as an IP address mapped thereto. Along with the MAC addresses, a multicast group address may be defined for each of the stacks 314, 316, 334, or 336 and may include the various stacks 314, 316, 334, or 336. The multicast group address may be may be manually entered for each of the stacks 314, 316, 334, or 336 or may be automatically determined. The multicast group address may be used in connection with the kernel bypass protocol 160 (FIG. 2).

Various requests or operations may be used to manage and/or populate the lookup tables 322, 324, 342, and 344. For instance, to join a group, a node 302 or 304 may transmit a "Join Group" IGMP message to allow the node 302 to become a member of the multicast group. Also, ARP requests may be directed to the nodes 302 or 304 and may be handled through the RNIC 308 or 328 to populate the second lookup tables 324 and 344, which contain information about remote devices. Once a node 302 or 304 becomes active, it may send out a multicast message to the multicast group address. The message may be a "MAP Request" or "Update MAP Request" message. The message may include flags, such as add, valid, or delete, which are associated with the addresses.

If statically defined addresses are used, the lookup tables 322, 324, 342, and 344 may be manually configured to include or add other addresses. For instance, the addresses may be assigned through a GUI interface, a registry, or from within the memory 320 or 340. Thus, with either static or dynamic addressing, the lookup table 322, 324, 342 and 344 may be managed to allow the nodes 302 or 304 to communicate through the appropriate stacks 314, 316, 334, and 336.

Advantageously, by utilizing the lookup tables 322, 324, 342 and 344, the nodes 302 and 304 may be able to manage the packets and direct the packets to the appropriate stack within a node 302 or 304. In addition, the nodes operating with WSD enabled stacks may not be limited to proprietary network and may operate on a heterogeneous network 306. Furthermore, the mapping or connection establishment mechanism may enable certain packets to be directed to specific stacks that allow the node 302 or 304 to operate in an enhanced manner over existing networks, while not having an adverse effect on the existing networks. Accordingly, a system employing one or more of the disclosed embodiments may exchange information with other systems faster because of the connection establishment mechanism.

Figure 4:
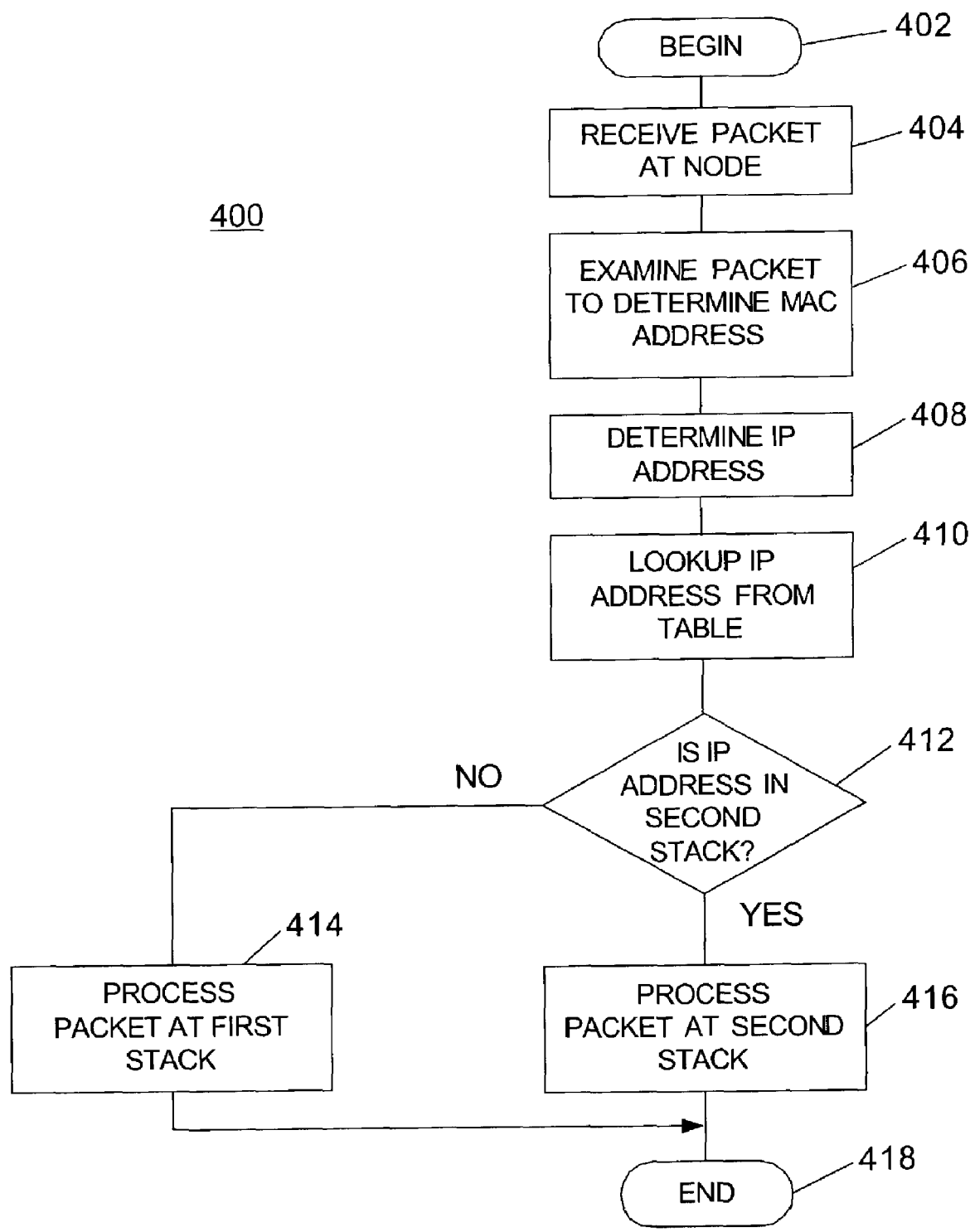
FIG. 4 is a process flow diagram illustrating the processing of a received packet in accordance with embodiments of the present invention.

FIG. 4 is a process flow diagram illustrating the processing of a received packet in accordance with embodiments of the present invention. In the diagram, generally referred to by reference numeral 400, a connection establishment mechanism may be implemented and may be utilized in a system, such as a computer system. The process begins at block 402. At block 404, a message or packet may be received at a node. The message may be a WSD packet, a TCP packet, an ARP message, an IGMP request, a "MAP Update Request" message, a "MAP Request" message or the like. The node may be a computer system or node 302 or 304 (FIG. 3) that includes multiple stacks. The stacks may be the first stacks 314 or 334 and the second stacks 316 or 336 (FIG. 3). One of the stacks may be a communication protocol stack, such as the communication protocol 158 (FIG. 2), while the other stack may be a kernel bypass protocol, such as the kernel bypass protocol 160. Then, as shown in block 406, the RNIC of the node may examine the packet to determine the MAC address. Then, the node may relate the MAC address of the packet to an IP address at block 408. Once the IP address is identified, the RNIC may access a lookup table to determine if the IP address is associated with the first stack or the second stack at block 410. The lookup table may be a lookup table that includes the mappings of local addresses. For instance the lookup table may be the lookup table 322 or 342 (FIG. 3).

At block 412, the RNIC may determine if the IP address is associated with a first stack IP address or a second stack IP address. If the IP address does not correspond to the second stack, the packet may be further processed by a first stack, such as first stack 314 or 334 (FIG. 3), at block 414. However, if the IP address does correspond to the second stack IP address, the packet may be further processed by a second stack, which may be the second stack 316 or 332 (FIG. 3) at block 416. In either block 414 or 416, the packet may be used to perform various functions or may include information for the node. After either block 414 or 416, the process may end, as shown at block 418.

Figure 5:
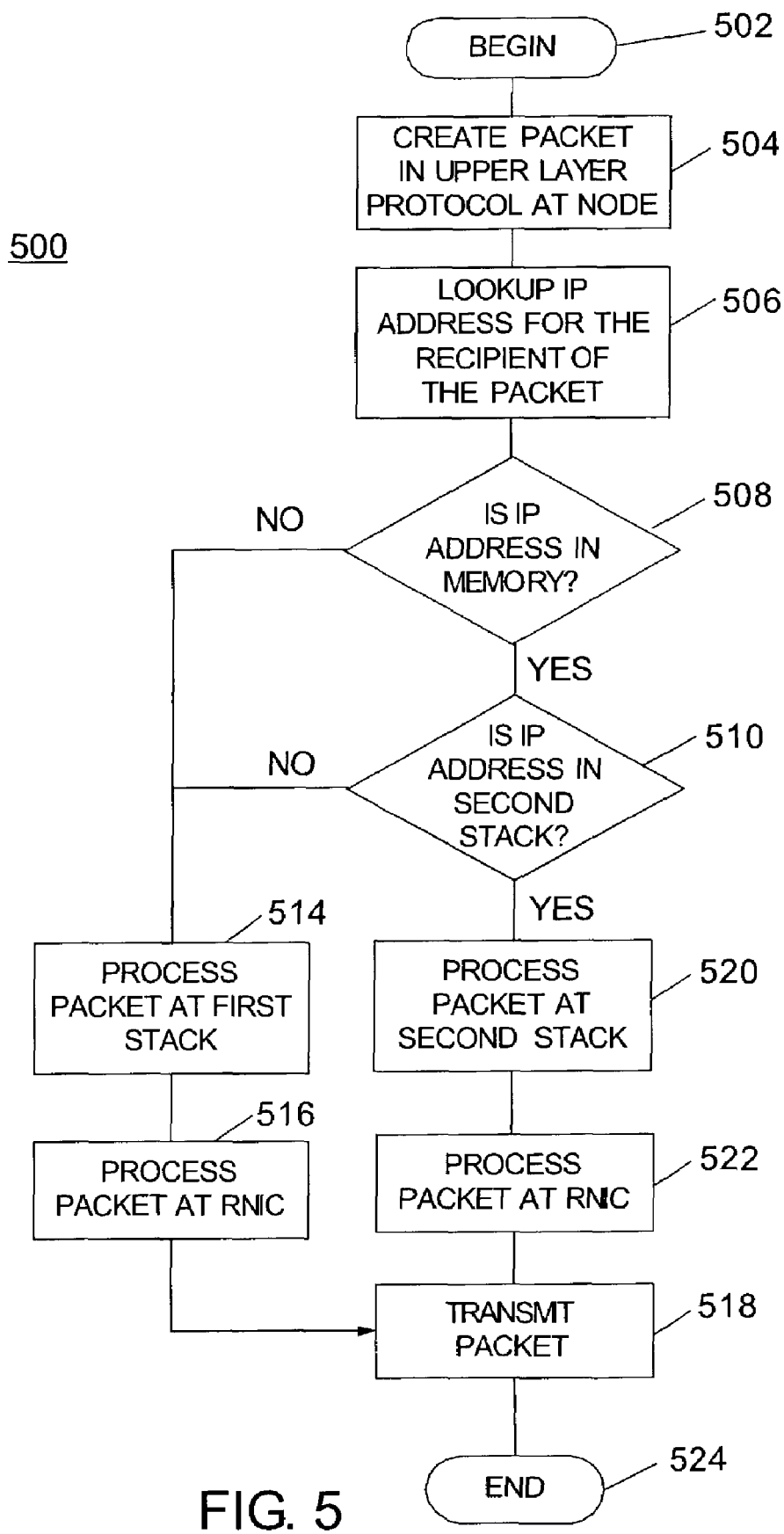
FIG. 5 is a process flow diagram illustrating the processing of a sent packet in accordance with embodiments of the present invention.

FIG. 5 is a process flow diagram illustrating the processing of a sent packet in accordance with embodiments of the present invention. In the diagram, generally referred to by reference numeral 500, a connection establishment mechanism may be implemented and may be utilized in a system, such as a computer system, to enable the system to communicate with other similarly enabled nodes. The process begins at block 502. At block 504, a message or packet may be created in an upper layer protocol, such as an application or API. The message may be an operation or information and may involve communication designated for a specific stack, such as stacks 314, 316, 334, or 336 (FIG. 3), in a multiple stack system. The message may include destination information for a specific node or group of nodes. The destination information may be an IP address, MAC address, or multicast group IP address, and/or MAC address.

At block 506, the node may determine the IP address for the destination node for the message. The node may lookup the IP address from a section of memory or lookup table within the systems memory, which may be the second lookup table 324 or 344 (FIG. 3). The memory or lookup table may include IP addresses for other nodes and may map the public IP addresses to the private IP addresses. The public IP addresses may correspond to a TCP/IP stack or other communication stack 158 (FIG. 2), while the private IP addresses may correspond to a WSD stack or other kernel bypass stack 160 (FIG. 2). In addition, to the IP addresses additional information may be included within the tables, such as MAC addresses or other information.

At block 508, the node may determine if the IP address is within memory. If the IP address is within the memory, then the node may determine if the IP address is in the second stack at block 510. However, if the IP address is not in memory, then the request may be directed to the first stack for processing at block 514. At block 510, the node may determine if the IP address is in the second stack. If the second stack has the IP address within a table or memory, such as the second lookup table 324 or 344 (FIG. 3), then the node may process the packet at the second stack in block 520. However, if the second stack does not have the IP address, then the request may be directed to the first stack for processing at block 514.

The message may be may be prepared for transmission at the first stack, which may be in a RNIC, such as RNIC 308 or 328 (FIG. 3). Accordingly, the packet may be processed at the RNIC with protocol layers at block 516. In preparing the message, the IP address for the intended recipient may be mapped to a MAC address and included with the message before being transmitted at block 518.

At the second stack, the node may further process the packet, as shown at block 520. The node may determine if the IP address is within a table, such as the second lookup table 324 or 344 (FIG. 3). If the IP address is within the table, the packet may be further processed in block 522 at the RNIC associated with the node, such as RNIC 308 or 328 (FIG. 3). In preparing the message, the IP address for the intended recipient may be mapped to a MAC address and included with the message before being transmitted at block 518. The packet may be transmitted to another node with an IP address within the table. Accordingly, the process may end, as shown at block 524.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A communication device for use in a node of a system having a plurality of nodes, each of the plurality of nodes having a network interface controller ("NIC"), each of the NICs being associated with a public identifier and a private identifier, the communication device comprising:
   a first protocol stack to operate according to a first protocol, the first protocol being associated with the public identifier;
   a second protocol stack to operate according to a second protocol, the second protocol being associated with the private identifier, the second protocol being the WinSock Direct ("WSD") protocol;
   a storage device that directly associates the public identifier of at least one NIC with the first protocol stack;
   a storage device that directly associates the private identifier of at least one NIC with the second protocol stack; and
   wherein messages that incorporate the public identifier are directed to the first protocol stack and messages that incorporate the private identifier are directed to the second protocol stack, and wherein a message which is received and/or sent by one of the plurality of nodes is processed to determine whether an internet protocol (IP) address of the message is associated with the second protocol stack, and wherein if the IP address is not associated with the second protocol stack, the message is directed to the first protocol stack.

2. The communication device set forth in claim 1, wherein the public identifier and private identifier associated with each of the NICs are both associated with a single communication port of the NIC.

3. The communication device set forth in claim 1, wherein the first protocol is the transmission control protocol ("TCP").

4. The communication device set forth in claim 1, wherein the public identifier and the private identifier are Internet Protocol ("IP") addresses.

5. The communication device set forth in claim 1, wherein the storage device that associates the public identifier of at least one NIC with the first protocol stack and the storage device that associates the private identifier of at least one NIC with the second protocol stack are the same storage device.

6. The communication device of claim 1, wherein the first and second protocol stacks are adapted to operate over a heterogeneous network.

7. The communication device of claim 1, wherein information contained within the messages is compared against information contained within the storage devices before the messages are directed to the first or second protocol stacks.

8. The communication device of claim 7, wherein if the information does not correspond to the second protocol stack, the message is directed to the first protocol stack.

9. The communication device set forth in claim 1, wherein the public identifier and the private identifier are media access control ("MAC") addresses.

10. A computer network, comprising:
a plurality of computer systems;
at least one input/output device;
a switch network that connects the plurality of computer systems and the at least one input/output device for communication; and
wherein the plurality of computer systems and the at least one input/output device comprise a network interface controller ("NIC"), each of the NICs having associated therewith a public identifier and a private identifier;
a first protocol stack to operate according to a first protocol, the first protocol being associated with the public identifier;
a second protocol stack to operate according to a second protocol, the second protocol being associated with the private identifier, the second protocol being the Win-Sock Direct ("WSD") protocol;
a storage device that directly associates the public identifier of at least one NIC with the first protocol stack;
a storage device that directly associates the private identifier of at least one NIC with the second protocol stack; and
wherein messages that incorporate the public identifier are directed to the first protocol stack and messages that incorporate the private identifier are directed to the second protocol stack, and wherein a message which is received and/or sent by one of the plurality of nodes is processed to determine whether an internet protocol (IP) address of the message is associated with the second protocol stack, and wherein if the IP address is not associated with the second protocol stack, the message is directed to the first protocol stack.

11. The computer network set forth in claim 10, wherein the public identifier and private identifier associated with each of the NICs are both associated with a single communication port of the NIC.

12. The computer network set forth in claim 10, wherein the first protocol is the transmission control protocol ("TCP").

13. The computer network set forth in claim 10, wherein the public identifier and the private identifier are Internet Protocol ("IP") addresses.

14. The computer network set forth in claim 10, wherein the storage device that associates the public identifier of at least one NIC with the first protocol stack and the storage device that associates the private identifier of at least one NIC with the second protocol stack are the same storage device.

15. The computer network of claim 10, wherein the first and second protocol stacks are adapted to operate over a heterogeneous network.

16. The computer network of claim 10, wherein information contained with in the messages is compared against information contained within the storage devices before the messages are directed to the first or second protocol stacks.

17. The computer network of claim 16, wherein if the information does not correspond to the second protocol stack, the message is directed to the first protocol stack.

18. The computer network set forth in claim 10, wherein the public identifier and the private identifier are media access control ("MAC") addresses.

19. A method of communicating in a computer network having a plurality of nodes, each of the plurality of nodes having a plurality of network interface controllers ("NICs"), each of the NICs having associated therewith a public identifier and a private identifier, the method comprising:
defining a first protocol stack to operate according to a first protocol, the first protocol being associated with the public identifier;
defining a second protocol stack to operate according to a second protocol, the second protocol being associated with the private identifier, the second protocol being the WinSock Direct ("WSD") protocol;
storing the public identifier of at least one NIC by directly associating the public identifier with the first protocol stack;
storing the private identifier of at least one NIC by directly associating the private identifier with the second protocol stack; and
directing messages that incorporate the public identifier to the first protocol stack and messages that incorporate the private identifier to the second protocol stack, and wherein a message which is received and/or sent by one of the plurality of nodes is processed to determine whether an internet protocol (IP) address of the message is associated with the second protocol stack, and wherein if the IP address is not associated with the second protocol stack, the message is directed to the first protocol stack.

20. The method set forth in claim 19, comprising associating the public identifier and private identifier for each of the NICs with a single communication port of the NIC.

21. The method set forth in claim 19, comprising defining the first protocol to be the transmission control protocol ("TCP").

22. The method set forth in claim 19, comprising defining the public identifier and the private identifier to be Internet Protocol ("IP") addresses.

23. The method of claim 19, wherein the first and second protocol stacks are adapted to operate over a heterogeneous network.

24. The method of claim 19, comprising comparing information contained within the messages against information contained within the storage devices before directing the messages to the first or second protocol stacks.

25. The method of claim 24, comprising directing the message to the first protocol stack if the information does not correspond to the second protocol stack.

26. The method set forth in claim 19, comprising defining the public identifier and the private identifier to be media access control ("MAC") addresses.

27. A communication device for use in a first node of a system having a plurality of nodes, each of the plurality of nodes having a network interface controller ("NIC"), each of the NICs being associated with a public identifier and a private identifier, the communication device comprising:
a first protocol stack to operate according to a first protocol, the first protocol being associated with the public identifier;

a second protocol stack that is adapted to operate according to a second protocol, the second protocol being associated with the private identifier, the second protocol being the WinSock Direct ("WSD") protocol;

a storage device that directly associates the public identifier of at least one NIC with the first protocol stack;

a storage device that directly associates the private identifier of at least one NIC with the second protocol stack; and wherein a message which is received and/or sent by one of the plurality of nodes is processed to determine whether an internet protocol (IP) address of the message is associated with the second protocol stack, and wherein if the IP address is not associated with the second protocol stack, the message is directed to the first protocol stack.

28. The communication device set forth in claim 27, wherein the public identifier and private identifier associated with each of the NICs are both associated with a single communication port of the NIC.

29. The communication device set forth in claim 27, wherein the first protocol is the transmission control protocol ("TCP").

30. The communication device set forth in claim 27, wherein the public identifier and the private identifier are Internet Protocol ("IP") addresses.

31. The communication device set forth in claim 27, wherein the storage device that associates the public identifier of at least one NIC with the first protocol stack and the storage device that associates the private identifier of at least one NIC with the second protocol stack are the same storage device.

32. The communication device set forth in claim 27, wherein the public identifier and the private identifier are media access control ("MAC") addresses.

33. A communication device for use in a node of a system having a plurality of nodes, each of the plurality of nodes having a network interface controller ("NIC"), each of the NICs being associated with a public identifier and a private identifier, the communication device comprising:

a first protocol stack to operate according to a first protocol, the first protocol being associated with the public identifier;

a second protocol stack to operate according to a second protocol, the second protocol being associated with the private identifier;

a storage device that directly associates the public identifier of at least one NIC with the first protocol stack;

a storage device that directly associates the private identifier of at least one NIC with the second protocol stack;

wherein messages that incorporate the public identifier are directed to the first protocol stack and messages that incorporate the private identifier are directed to the second protocol stack, and wherein a message which is received and/or sent by one of the plurality of nodes is processed to determine whether an internet protocol (IP) address of the message is associated with the second protocol stack, and wherein if the IP address is not associated with the second protocol stack, the message is directed to the first protocol stack; and wherein the public identifier and the private identifier are media access control ("MAC") addresses.

34. A computer system having a network interface controller ("NIC"), the NIC being associated with a public identifier and a private identifier, the computer system comprising:

a first protocol stack to operate according to a first protocol, the first protocol being associated with the public identifier;

a second protocol stack that is adapted to operate according to a second protocol, the second protocol being associated with the private identifier;

a storage device that directly associates the public identifier of at least one NIC with the first protocol stack;

a storage device that directly associates the private identifier of at least one NIC with the second protocol stack;

wherein messages that incorporate the public identifier are directed to the first protocol stack and messages that incorporate the private identifier are directed to the second protocol stack, and wherein a message which is received and/or sent by one of the plurality of nodes is processed to determine whether an internet protocol (IP) address of the message is associated with the second protocol stack, and wherein if the IP address is not associated with the second protocol stack, the message is directed to the first protocol stack; and wherein the public identifier and the private identifier are media access control ("MAC") addresses.

* * * * *

UNITED STATES PATENT AND TRADEMARK OFFICE
CERTIFICATE OF CORRECTION

PATENT NO.         : 7,554,993 B2                                           Page 1 of 1
APPLICATION NO. : 10/401237
DATED              : June 30, 2009
INVENTOR(S)        : Prashant Modi et al.

It is certified that error appears in the above-identified patent and that said Letters Patent is hereby corrected as shown below:

In column 9, line 67, in Claim 16, delete "with in" and insert -- within --, therefor.

In column 11, line 1, in Claim 27, after "stack" delete "that is adapted".

In column 12, line 24, in Claim 34, after "stack" delete "that is adapted".

Signed and Sealed this

Twenty-fourth Day of November, 2009

David J. Kappos
*Director of the United States Patent and Trademark Office*